United States Patent
Jacobsen et al.

(10) Patent No.: US 8,536,081 B2
(45) Date of Patent: Sep. 17, 2013

(54) SUPPORTED POLYMERISATION CATALYSTS

(75) Inventors: Grant Berent Jacobsen, Tervuren (BE); Dusan Jeremic, Alberta (CA); Sergio Mastroianni, Etterbaek (BE); Ian Douglas McKay, Alberta (CA)

(73) Assignee: Ineos Europe Limited, Hampshire (GB)

( * ) Notice: Subject to any disclaimer, the term of this patent is extended or adjusted under 35 U.S.C. 154(b) by 767 days.

(21) Appl. No.: 11/667,466

(22) PCT Filed: Nov. 10, 2005

(86) PCT No.: PCT/GB2005/004344
§ 371 (c)(1), (2), (4) Date: Nov. 7, 2007

(87) PCT Pub. No.: WO2006/054048
PCT Pub. Date: May 26, 2006

(65) Prior Publication Data
US 2008/0139763 A1    Jun. 12, 2008

(30) Foreign Application Priority Data
Nov. 18, 2004    (GB) .................................. 0425443.9

(51) Int. Cl.
*B01J 31/38* (2006.01)
*B01J 31/00* (2006.01)
*C08F 4/52* (2006.01)
*C08F 4/64* (2006.01)
*C08F 4/76* (2006.01)

(52) U.S. Cl.
USPC ........... 502/113; 502/103; 502/104; 526/113; 526/118; 526/119; 526/160; 526/161; 526/170; 526/172; 526/134; 526/131; 526/111; 526/117

(58) Field of Classification Search
USPC ................. 526/134, 172, 161, 160, 170, 113, 526/118; 502/113, 103
See application file for complete search history.

(56) References Cited

U.S. PATENT DOCUMENTS

| | | | | |
|---|---|---|---|---|
| 5,783,512 | A  * | 7/1998 | Jacobsen et al. | 502/124 |
| 6,207,606 | B1 * | 3/2001 | Lue et al. | 502/113 |
| 6,235,672 | B1 * | 5/2001 | McKay et al. | 502/155 |
| 6,486,273 | B1   | 11/2002 | McKay et al. | |

OTHER PUBLICATIONS

International Preliminary Report on Patentability; Int'l Application No. PCT/GB2005/004344; Int'l Filing Date Nov. 10, 2005, (7 pgs).

* cited by examiner

*Primary Examiner* — Rip A. Lee
(74) *Attorney, Agent, or Firm* — Nixon & Vanderhye

(57) ABSTRACT

Supported catalyst system for the polymerization of olefins, having at least two different monocyclopentadienyl transition metal compounds, one or more activators including an ionic compound having (i) a cation and (ii) an anion having up to 100 non-hydrogen atoms and the anion containing at least one substituent comprising a moiety having an active hydrogen, and one or more support materials. The supported "mixed or dual site" catalyst systems having different monocyclopentadienyl catalysts when activated by specific ionic activators lead to catalyst systems showing an improved balance of properties which may be used to prepare LLDPE polymers having broad melt flow ratios.

10 Claims, 1 Drawing Sheet

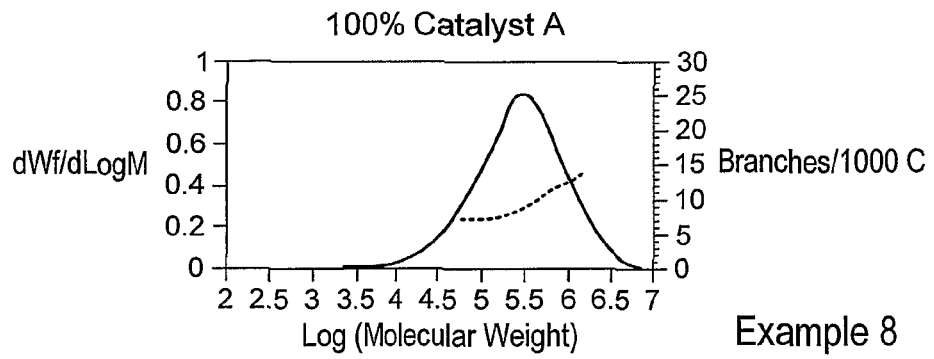
Example 8
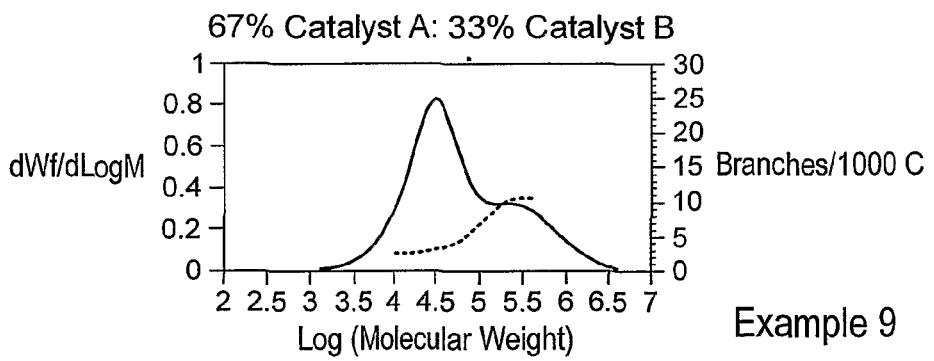
Example 9
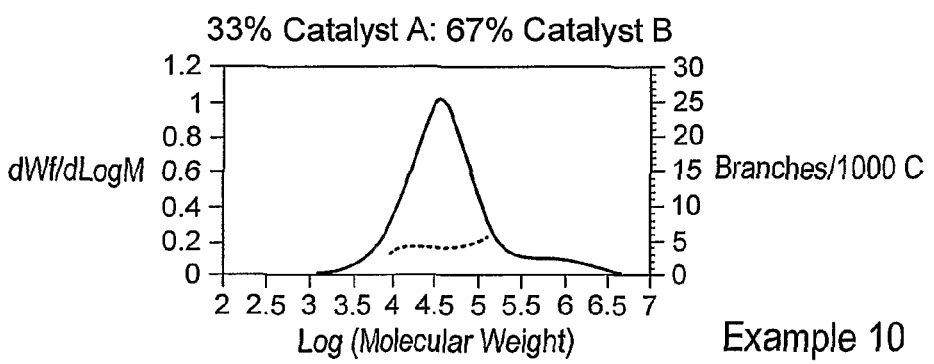
Example 10
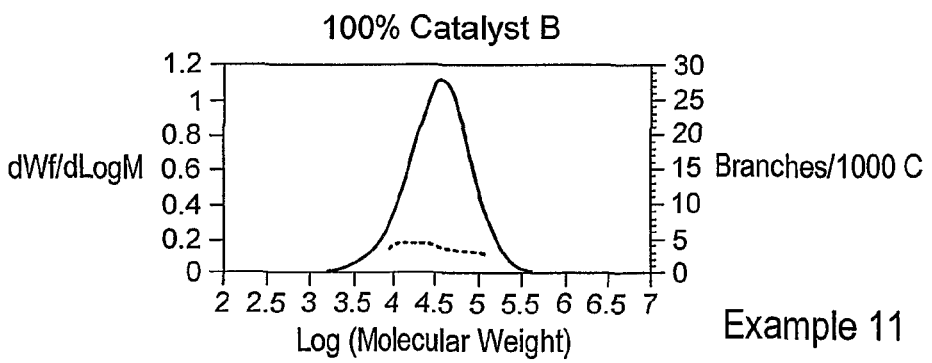
Example 11

SUPPORTED POLYMERISATION CATALYSTS

This application is the U.S. National Phase of International Application PCT/GB2005/004344, filed 10 Nov. 2005, which designated the U.S. PCT/GB2005/004344 claims priority to British Application No. 0425443.9 filed 18 Nov. 2004. The entire content of these applications are incorporated herein by reference.

The present invention relates to supported catalysts suitable for the polymerisation of olefins and in particular to supported metallocene catalysts providing advantages for operation in gas phase processes for the polymerisation of ethylene or the copolymerisation of ethylene and α-olefins having from 3 to 10 carbon atoms.

BACKGROUND OF THE INVENTION

In recent years there have been many advances in the production of polyolefin homopolymers and copolymers due to the introduction of metallocene catalysts. Metallocene catalysts offer the advantage of generally a higher activity than traditional Ziegler catalysts and are usually described as catalysts which are single site in nature. There have been developed several different families of metallocene complexes. In earlier years catalysts based on bis(cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the bis(cyclopentadienyl) and mono(cyclopentadienyl) complexes have been described in WO 96/04290 and WO 95/00526 respectively.

Other known monocyclopentadienyl complexes are those comprising phosphinimine ligands as described in WO 99/40125, WO 00/05237, WO 00/05238 and WO 00/32653. A typical example of such a complex is cyclopentadienyl titanium [tri-(tertiary-butyl) phosphinimine]dichloride.

The above metallocene complexes are utilised for polymerisation in the presence of a cocatalyst or activator. Typically activators are aluminoxanes, in particular methyl aluminoxane or alternatively may be compounds based on boron compounds. Examples of the latter are borates such as trialkyl-substituted ammonium tetraphenyl- or tetrafluorophenyl-borates or triarylboranes such as tris(pentafluorophenyl)borane. Catalyst systems incorporating borate activators are described in EP 561479, EP 418044 and EP 551277.

The above metallocene complexes may be used for the polymerisation of olefins in solution, slurry or gas phase. When used in the slurry or gas phase the metallocene complex and/or the activator are suitably supported. Typical supports include inorganic oxides eg. silica or polymeric supports may alternatively be used.

Examples of the preparation of supported metallocene catalysts for the polymerisation of olefins may be found in WO 94/26793, WO 95/07939, WO 96/00245, WO 96/04318, WO 97/02297 and EP 642536.

WO 98/27119 describes supported catalyst components comprising ionic compounds comprising a cation and an anion in which the anion contains at least one substituent comprising a moiety having an active hydrogen. In this disclosure supported metallocene catalysts are exemplified in which the catalyst is prepared by treating the aforementioned ionic compound with a trialkylaluminium compound followed by subsequent treatment with the support and the metallocene.

Metallocene catalysts have also been referred to as "single-site" catalysts and have been used to prepare polyethylenes having a narrow molecular weight distribution. Linear low density polyethylenes (LLDPE's), prepared from the copolymerisation of ethylene and higher α-olefins in the presence of such "single-site" catalysts typically exhibit a uniform composition distribution wherein the comonomer is uniformly distributed within the polymer chains. The combination of narrow molecular weight distribution and uniform composition distribution distinguishes these polymers from "conventional" LLDPE which is prepared from a Ziegler-Natta catalyst or a chromium catalyst.

The conventional LLDPE products have a broad molecular weight distribution and a broad composition distribution and these properties are seen in the resultant physical properties of the polymers. LLDPE's prepared from a single site catalyst have improved dart impact strength and optical properties compared with conventional LLDPE's. However conventional LLDPE's are easier to process in mixing and extrusion equipment.

It would therefore be highly desirable to prepare LLDPE's which possess the improved physical properties provided by the single site catalysts as well as the improved processability of the polymers prepared by conventional catalysts.

Mixed catalysts have been used to try to achieve this desired balance of properties. For example EP 128045 describes the use of two different metallocenes in a single reactor. The metallocenes are bis(cyclopentadienyl) metal complexes activated by aluminoxanes. EP 232595 describes the use of a supported catalyst prepared from a metallocene catalyst and a Ziegler-Natta catalyst. Again the metallocene catalysts are typically bis(cyclopentadienyl) metal complexes activated by aluminoxanes.

The use of such mixed catalyst systems is often associated with operability problems for example the use of two different metallocenes on a single support as described in the aforementioned EP 232595 may lead to difficulties with process control.

WO 01/05849 describes mixed polymerisation catalyst systems comprising at least two different phosphinimine catalysts supported on a single support which may be used to prepare LLDPE's having a broadened molecular weight distribution. The phosphinimine catalysts typically comprise monocyclopentadienyl ligands as described in WO 99/40125, WO 00/05237, WO 00/05238 and WO 00/32653. These "mixed" monocyclopentadienyl catalyst systems are activated by aluminoxanes for example methyl aluminoxane (MAO) or ionic activators for example borates such as N,N-dimethylanilinium tetrakispentafluorophenyl borate.

WO 97/44371 describes copolymers having a reverse comonomer distribution prepared in a single reactor by use of polymerisation catalyst system comprising a single metallocene complex. By reverse comonomer distribution is meant a copolymer having a comonomer content that is higher in the higher molecular weight fraction.

SUMMARY OF THE INVENTION

We have now surprisingly found that supported "mixed or dual site" catalyst systems comprising different monocyclopentadienyl catalysts when activated by specific ionic activators lead to catalyst systems showing an improved balance of properties which may be used to prepare LLDPE polymers having broad melt flow ratios.

In particular by use of certain dual site catalyst systems copolymers showing a reverse comonomer distribution may be prepared in a single reactor.

Thus according to a first aspect of the present invention there is provided a supported catalyst system for the polymerisation of olefins, said catalyst system comprising
(a) at least two different monocyclopentadienyl transition metal compounds,
(b) one or more activators comprising an ionic compound comprising (i) a cation and (ii) an anion having up to 100 non-hydrogen atoms and the anion containing at least one substituent comprising a moiety having an active hydrogen, and
(c) one or more support materials.

The monocyclopentadienyl transition metal compounds of component (a) of the present invention may be chosen from the following groups of compounds:

Phosphinimine complexes having the general formula (Cp)$m$M(PI)$n$L$q$ wherein
Cp is a ligand from the group consisting of cyclopentadienyl, substituted cyclopentadienyl, indenyl, substituted indenyl, fluorenyl and substituted fluorenyl,
M is a Group 4 metal selected from hafnium, titanium or zirconium,
PI is a phosphinimine ligand,
L is an activatable ligand,
m is 1 and n is 1 or 2, q is 1 or 2, and
m+n+q equals the valence of said metal.
The preferred Group 4 metal is titanium.
The phospinimine ligands are defined by the formula:

R$_3$P=N— wherein each R is independently selected from the group consisting of a hydrogen atom, a halogen atom, a $C_{1-20}$ hydrocarbyl radical, a $C_{1-8}$ alkoxy radical, a $C_{6-10}$ aryl or aryloxy radical, an amido radical, a silyl radical and a germanyl radical.

Preferred phosphinimine ligands are those wherein each R is a hydrocarbyl radical and a particularly preferred phosphinimine ligand is tri-(tertiary butyl) phosphinimine.

The activatable ligands are those which may be activated by a cocatalyst for polymerisation. Suitable ligands are independently selected from the group consisting of a hydrogen atom, a halogen atom, a $C_{1-10}$ hydrocarbyl radical, a $C_{1-10}$ alkoxy radical and similar.

The preferred phosphinimine complexes for use in the present invention are those wherein the Cp is cyclopentadienyl or substituted cyclopentadienyl and the activatable ligand is halide for example chloride or alkyl for example methyl.

Particularly preferred complexes have the formula (Cp)(t-Bu$_3$P=N)TiCl$_2$ or (Cp(C$_6$F$_5$)(tBu$_3$PN)TiCl$_2$ and the dimethyl derivatives thereof or (N-(tert-butyl)-1,1-di-p-tolyl-1-((1,2,3,3a,7a-η)-3-(1,3-dihydro-2H-isoindol-2-yl)1H-inden-1-yl)silanaminato-(2-)-N-)dimethyltitanium or (dimethyl)(1-n-butyl-2-pentafluorophenyl-cyclopentadienyl) (tri-tertiarybutylphosphihimido)titanium.

Suitable complexes of this type are described in WO 99/40125, WO 00/05237, WO 00/05238, WO 00/32653 and WO 01/05849, the relevant portions of which are incorporated herein by reference.

Also suitable for use as the monocyclopentadienyl transition metal complex of component (a) of the present invention are complexes of the formula:

CpMX$_n$ wherein Cp is a single cyclopentadienyl or substituted cyclopentadienyl group optionally covalently bonded to M through a substituent, M is a Group VIA metal bound in a η$^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

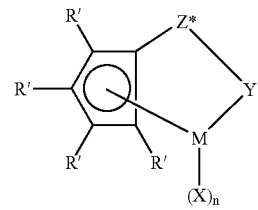

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido)dimethyl(tetramethyl-η$^5$-cyclopentadienyl)silanetitanium dichloride and (2-methoxyphenylamido) dimethyl(tetramethyl-η$^5$-cyclopentadienyl)silanetitanium dichloride.

Particularly preferred metallocene complexes for use in the present invention may be represented by the general formula:

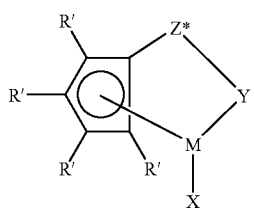

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, tetrahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane- or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex for use in the supported catalyst systems of the present invention is (t-butylamido)(tetramethyl-$\eta^5$-cyclopentadienyl)dimethyl silanetitanium-$\eta^4$-1,3-pentadiene.

Another suitable complex is (N-(tert-butyl)-1,1-di-p-tolyl-1-((1,2,3,3a,7a-η)-3-(1,3-dihydro-2H-isoindol-2-yl)1H-inden-1-yl)silanaminato-(2-)-N-)dimethyltitanium.

Component (a) of the present invention most preferably comprises a phosphinimine complex and a reduced oxidation state monocyclopentadienyl metal complex. Most preferably both complexes comprise titanium metals.

A suitable combination for component (a) of the present invention is $(Cp(C_6F_5)(tBu_3PN)TiCl_2$ and $(C_5Me_4SiMe_2N^tBu)Ti(\eta^4$-1,3-pentadiene).

Alternatively component (a) may comprise at lease two different transition metal compounds comprising phosphinimine ligands. A particularly preferred component (a) comprises the combination of (i) (N-(tert-butyl)-1,1-di-p-tolyl-1-((1,2,3,3a,7a-η)-3-(1,3-dihydro-2H-isoindol-2-yl)1H-inden-1-yl)silanaminato-(2-)-N-)dimethyltitanium, and (ii) (dimethyl)(1-n-butyl-2-pentafluorophenyl-cyclopentadienyl)(tri-tertiarybutylphosphinimido)titanium Also suitable as component (a) is the combination of either of the aforementioned compounds comprising phosphinimine ligands and a reduced oxidation state monocyclopentadienyl metal complex as hereinbefore described.

The monocyclopentadienyl transition metal compounds of component (a) are typically present in the supported catalyst system in an equimolar ratio.

The cation of the ionic activator of component (b) may be selected from the group consisting of acidic cations, carbonium cations, silylium cations, oxonium cations, organometallic cations and cationic oxidizing agents.

Suitably preferred cations include trihydrocarbyl substituted ammonium cations eg. triethylammonium, tripropylammonmoium, tri(n-butyl) ammonium and similar. Also suitable are N,N-dialkylammonium cations such as N,N-dimethylanilinium cations.

Particularly suitable are those cations having longer alkyl chains such as dihexyldecylmethylammonium, dioctadecylmethylammonium, ditetradecylmethylammonium, bis(hydrogenated tallow alkyl) methylammonium and similar.

Examples of suitable anions include:
triphenyl(hydroxyphenyl) borate
tri(p-tolyl)(hydroxyphenyl) borate
tris(pentafluorophenyl)(hydroxyphenyl) borate
tris(pentafluorophenyl)(4-hydroxyphenyl) borate Particular preferred ionic activators are alkylammonium tris(pentafluorophenyl) 4-(hydroxyphenyl) borates. A particularly preferred activator is bis(hydrogenated tallow alkyl) methyl ammonium tris(pentafluorophenyl) (4-hydroxyphenyl) borate.

Suitable activators of this type are described in WO 98/27119 the relevant portions of which are incorporated herein by reference.

Particular preferred ionic activators are alkylammonium tris(pentafluorophenyl) 4-(hydroxyphenyl) borates. A particularly preferred activator is bis(hydrogenated tallow alkyl) methyl ammonium tris(pentafluorophenyl) (4-hydroxyphenyl) borate having the formula

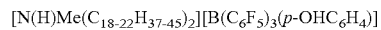

Preferably the ionic activator of component (b) is treated with an organometallic compound. Preferred organometallic compounds are organoaluminium compounds for example trialkylaluminium compounds. Most preferred compounds are triethylaluminium or triisobutylaluminium.

Suitable support materials for component (c) of the present invention include inorganic metal oxides, inorganic halides or alternatively polymeric supports may be used for example polyethylene, polypropylene, clays, zeolites, etc.

Suitable inorganic metal oxides include silica, alumina and mixtures thereof.

The most preferred support material for use with the supported catalysts according to the method of the present invention is silica. Suitable silicas include Ineos ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

Particularly preferred organoaluminium compounds are triethylaluminium and triisobutylaluminium.

The support material is pretreated with the organometallic compound at a temperature of −20° C. to 150° C. and preferably at 20° C. to 100° C.

The supported catalyst system of the present invention may suitably comprise both monocyclopentadienyl transition metal compounds supported on the same support.

The supported catalyst systems according to the present invention may be prepared by combining the catalyst components (a), (b) and (c) together in any order.

Preferably the silica support is treated with the ionic compound followed sequentially by the monocyclopentadienyl transition metal complexes.

Thus according to another aspect of the present invention there is provided a method for the preparation of a supported catalyst system for the polymerisation of olefins, said method comprising the following steps:
  (i) addition of an activator comprising an ionic compound comprising (a) a cation and (b) an anion having up to 100 non-hydrogen atoms and the anion containing at least one substituent comprising a moiety having an active hydrogen to a support material,
  (ii) addition of a first monocyclopentadienyl transition metal compound, and
  (iii) addition of a second monocyclopentadienyl transition metal compound.

Most preferably the support material has been pretreated with an organometallic compound prior to contact with the ionic compound.

Alternatively the method of this aspect of the present invention may additionally comprise treatment of the support material with a polymerisable monomer.

Suitable monomers include ethylene, propylene, 1-butene, 1-hexene, 1-octene, 1-decene, styrene, butadiene, and polar monomers for example vinyl acetate, methyl methacrylate, etc. Preferred monomers are ethylene, propylene, 1-butene or -hexene.

A particularly preferred monomer is 1-hexene.

Alternatively the monocyclopentadienyl transition metal compounds may be supported on separate supports which may be the same or different.

In one embodiment the supported polymerisation catalyst system may comprise a physical mixture of each monocyclopentadienyl transition metal compound on a separate support.

Thus according to another aspect of the present invention there is provided a catalyst system comprising a physical mixture of
  (a) a first monocyclopentadienyl transition metal compound, an activator comprising an ionic compound comprising (i) a cation and (ii) an anion having up to 100 non-hydrogen atoms and the anion containing at least one substituent comprising a moiety having an active hydrogen and a support material, and
  (b) a second monocyclopentadienyl transition metal compound, an activator comprising an ionic compound comprising (i) a cation and (ii) an anion having up to 100 non-hydrogen atoms and the anion containing at least one substituent comprising a moiety having an active hydrogen and a support material.

According to another aspect of the present invention there is provided a supported catalyst system comprising
  (a) at least two different monocyclopentadienyl transition metal compounds,
  (b) one or more activators comprising an ionic compound comprising (i) a cation and (ii) an anion having up to 100 non-hydrogen atoms and the anion containing at least one substituent comprising a moiety having an active hydrogen, and
  (c) one or more support materials.

The supported catalyst systems of the present invention are most suitable for operation in processes which typically employ supported polymerisation catalysts.

The supported catalysts of the present invention may be suitable for the polymerisation of olefin monomers selected from (a) ethylene, (b) propylene (c) mixtures of ethylene and propylene and (d) mixtures of (a), (b) or (c) with one or more other alpha-olefins.

Thus according to another aspect of the present invention there is provided a process for the polymerisation of olefin monomers selected from (a) ethylene, (b) propylene (c) mixtures of ethylene and propylene and (d) mixtures of (a), (b) or (c) with one or more other alpha-olefins, said process performed in the presence of a supported polymerisation catalyst system as hereinbefore described.

The supported systems of the present invention are however most suitable for use in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

Thus according to another aspect of the present invention there is provided a process for the polymerisation of ethylene or the copolymerisation of ethylene and α-olefins having from 3 to 10 carbon atoms, said process performed under polymerisation conditions in the present of a supported catalyst system prepared as hereinbefore described.

The preferred α-olefins are 1-butene, 1-hexene, 4-methyl-1-pentene and 1-octene.

The use of catalyst systems comprising two different monocyclopentadienyl transition metal complexes activated by the specific ionic compounds according to the present invention generates polyethylenes having broad melt flow ratios.

It is a particular advantage of the supported dual site catalyst systems of the present invention that they may be used to prepare copolymers having a comonomer content that is higher in the higher molecular weight fraction in a single reactor.

Thus according to another aspect of the present invention there is provided a process for the preparation of copolymers of ethylene and α-olefins having a comonomer content that is higher in the higher molecular weight fraction, said process comprising copolymerising ethylene and said α-olefins in a single reactor in the presence of a supported dual site catalyst system.

The preferred dual site catalyst system of this aspect of the present invention comprises at least one monocyclopentadienyl transition metal compound.

The most preferred dual catalyst system of this aspect of the present invention comprises at least two different monocyclopentadienyl transition metal compounds.

The preferred monocyclopentadienyl transition metal compound for use in this aspect of the present invention has the formula:

(Cp)$_m$M(PI)$_n$L$_q$ wherein

Cp is a ligand from the group consisting of cyclopentadienyl, substituted cyclopentadienyl, indenyl, substituted indenyl, fluorenyl and substituted fluorenyl, M is a Group 4 metal selected from hafnium, titanium or zirconium, PI is a phosphinimine ligand, L is an activatable ligand, m is 1 and n is 1 or 2, q is 1 or 2, and m+n+q equals the valence of said metal.

Preferred compounds are those wherein the phospinimine ligands are defined by the formula:

R$_3$P=N— wherein each R is independently selected from the group consisting of a hydrogen atom, a halogen atom, a $C_{1-20}$ hydrocarbyl radical, a $C_{1-8}$ alkoxy radical, a $C_{6-10}$ aryl or aryloxy radical, an amido radical, a silyl radical and a germanyl radical.

Preferably component (a) comprises at least two different monocyclopentadienyl transition metal compounds having phosphinimine ligands.

Alternatively the catalyst system according to this aspect of the present invention may comprise any of the monocyclopentadienyl transition metal compounds as hereinbefore described.

The monocyclopentadienyl transition metal compounds of this aspect of the present invention may be present in any suitable molar ratio.

The catalyst systems according to this aspect of the present invention may comprise one or more activators comprising an ionic compound comprising (i) a cation and (ii) an anion having up to 100 non-hydrogen atoms and the anion containing at least one substituent comprising a moiety having an active hydrogen.

BRIEF DESCRIPTION OF THE DRAWINGS

The invention will be described with reference to the accompanying drawing in which FIG. 1 shows the GPC-FTIR analyses for the products of Examples 8-11.

EXAMPLES

The present invention will now be illustrated by reference to the accompanying examples.

ABBREVIATIONS

| | |
|---|---|
| Ionic Compound A | [N(H)Me(C$_{18-22}$H$_{37-45}$)$_2$][B(C$_6$F$_5$)$_3$(p-OHC$_6$H$_4$)] |
| TEA | triethylaluminium |
| TiBA | triisobutylaluminium |
| Complex A | (Cp(C$_6$F$_5$)(tBu$_3$PN)TiCl$_2$ |
| Complex B | (C$_5$Me$_4$SiMe$_2$N$^t$Bu)Ti(η$^4$-1,3-pentadiene) |
| Complex C | (N-(tert-butyl)-1,1-di-p-tolyl-1-((1,2,3,3a,7a-η)-3-(1,3-dihydro-2H-isoindol-2-yl)1H-inden-1-yl)silanaminato-(2-)-N-)dimethyltitanium. |
| Complex D | (dimethyl)(1-n-butyl-2-pentafluorophenyl-cyclopentadienyl)(tri-tertiarybutylphosphinimido)titanium |

Example 1

To 1.41 ml (0.098 mmol) of a toluene solution of Ionic Compound A (9.1% wt) was added 0.39 ml (0.098 mmol) of a toluene solution of TEA ([Al]=0.25 mol/l). This solution was the added to 2 g of TEA treated silica (Sylopol 2408 previously calcined at 250° C. for 5 hours, [Al]=1.39 mmol/g) and the mixture was well agitated until no lumps were visible and was allowed to stand for 30 min. 0.338 ml (0.049 mmol) of a toluene solution of Complex A, (9.9 wt %) that had been heated at 80° C. for 1 hour was added to the above mixture followed by 0.294 ml (0.049 mmol) of an heptane solution of Complex B (8.57% wt). The mixture was well agitated until no lumps were visible and allowed to stand for 30 min. The solid was the washed three times with 10 ml of hexane and dried under vacuum to obtain a free flowing powder.
[Al]=1.36 mmol/g
[Ti]=36.4 μmol/g Example 2

To 1.57 ml (0.109 mmol) of a toluene solution of Ionic Compound A (9.1% wt) was added 0.437 ml (0.109 mmol) of a toluene solution of TEA ([Al]=0.25 mol/l). This solution was the added to 2 g of TEA treated silica (Sylopol 2408 previously calcined at 250° C. for 5 hours, [Al]=1.39 mmol/g) and the mixture was well agitated until no lumps were visible and was allowed to stand for 30 min. 0.48 ml of 1-hexene was the added and after 30 minutes of agitation 0.376 ml (0.055 mmol) of a toluene solution of Complex A (9.9 wt %) that had been heated at 80° C. for 1 hour was added to the above mixture followed by 0.327 ml (0.055 mmol) of an heptane solution of Complex B (8.57% wt). The mixture was well agitated until no lumps were visible, allowed to stand for 30 min and finally dried under vacuum.

[Al]=1.15 mmol/g
[Ti]=35.4 μmol/g

Example 3

To 1.573 ml (0.109 mmol) of a toluene solution of Ionic Compound A (9.1% wt) was added 0.412 ml (0.109 mmol) of a toluene solution of TiBA ([Al]=0.265 mol/l). This solution was the added to 2 g of TiBA treated silica (Sylopol 2408 previously calcined at 250° C. for 5 hours, [Al]=1.17 mmol/g) and the mixture was well agitated until no lumps were visible and was allowed to stand for 30 min. 0.48 ml of 1-hexene was the added and after 30 minutes of agitation, 0.377 ml (0.055 mmol) of a toluene solution of Complex A (9.9 wt %), that had been heated at 80° C. for 1 hour, was added to the above mixture followed by 0.327 ml (0.055 mmol) of an heptane solution of Complex B (8.57% wt). The mixture was well agitated until no lumps were visible, allowed to stand for 30 min and finally dried under vacuum.

[Al]=0.96 mmol/g
[Ti]=41.7 μmol/g

Example 4

Polymerisation Runs

The above catalysts were tested for ethylene-1-hexene copolymerisation as follows:
A 2.5 l double jacketed thermostatic stainless steel autoclave was purged with nitrogen at 70° C. for at least one hour. 150 g of PE pellets previously dried under vacuum at 80° C. for 12 hours were introduced and the reactor was then purged three times with nitrogen (7 bar to atmospheric pressure). ~0.13 g of TEA treated silica (1.5 mmol TEA/g) was added under pressure and allowed to scavenge impurities for at least 15 minutes under agitation. The gas phase was then composed (addition of ethylene, 1-hexene and hydrogen) and a mixture of supported catalyst (~0.1 g) and silica/TEA (~0.1 g) was injected. A constant pressure of ethylene and a constant pressure ratio of ethylene/co-monomer were maintained during the run. The run was terminated by venting the reactor and then purging the reactor 3 times with nitrogen. The PE powder produced during the run was then separated from the PE seed bed by simple sieving.
Typical conditions are as follows:
Temperature: 70° C.
Ethylene pressure: 6.5b
catalyst added: 0.100 g.
batch addition of hydrogen
continuous addition of 1-hexene with constant C6/C2 ratio (% vol)
run length: 1 h
The results are shown in the following Table:

TABLE 1

| Catalyst | H2 ml | C6/C2 (% vol) | Activity (g/g · h · bar) | Annealed Density g/ml | MI g/10 min | MFR |
|---|---|---|---|---|---|---|
| Example 1 | 25 | 0.84 | 79 | 0.919 | 0.77 | 28 |
| Example 2 | 35 | 0.78 | 77 | 0.920 | 0.93 | 27 |
| Example 3 | 25 | 0.75 | 73 | 0.920 | 0.9 | 27 |

Analytical Techniques

The density and the MI were performed in accordance with ISO 1183 and ISO 1133 respectively. MFk corresponds to the ratio of MI (21.6 kg)/MI (2.16 kg).

Examples 5 and 6 (Comparative)

Examples 9 and 10 of the aforementioned WO 01/05849 describe the gas phase copolymerisation of ethylene and 1-hexene in the presence of a "dual catalyst" system comprising a silica supported mixture of a phosphinimine catalyst and a constrained geometry monocyclopentadienyl complex activated by methyl aluminoxane (MAO). The specific phosphinimine used was indenyl tri-tertiarybutylphosphinimidyl titanium dichloride or $(Ind)(tBu_3P=N)TiCl_2$ and the monocyclopentadienyl complex was dimethylsilane(2,3,4,5-tetramethylcyclopentadienyl)(tertiary-butylamido) titanium dichloride or $(Cp*Si(CH_3)_2tBuN)TiCl_2$.

Both examples describe the use of a catalyst system comprising components (a) and (c) of the present invention but comprising as component (b) an aluminoxane activator rather than the ionic compound of the present invention. The activities for examples 9 and 10 were 24 and 6.4 g/g.h.bar (as expressed in the same units as for the examples of the present invention). The catalyst system of the present invention clearly shows that the specific ionic compound of component (b) activates both the monocyclopentadienyl transition metal complexes of the present invention whereas in examples 9 and 10 of WO 01/05849 the aluminoxane poorly activates the other catalyst components.

Example 7

Catalyst Synthesis

Catalysts A and B
Grace-Davison Sylopol 948 silica was dehydrated at 250° C. under a nitrogen atmosphere for 5 hours, prior to use in the preparation of the TEAL-passified silica described in the following section.
a) TEAL-Passified Silica ($SiO_2$/TEAL)
Add 650 mL of dry, degassed heptane to a 1 L, pear-shaped flask, followed by 11.25 mL of a 0.29 wt % solution of Stadis® 425 (Octel Starrion L.L.C.) in heptane, and 150 g of calcined Sylopol 948 silica. The flask was placed on the rotating arm of a rotary evaporator and turned slowly for 15 minutes. 100 mL of a 25 wt % TEA in hexane solution was added to the flask and then swirled by hand (Note: there is some heat evolution). 75 mL of 25 wt % TEA in hexane was then added. The flask was then placed on the rotating arm of a rotary evaporator and turned slowly for 1 hour. The slurry was filtered. The filter cake was transferred back to the flask, reslurried in 350 mL of heptane and rotated for an additional 30 minutes. The slurry was filtered. The filter cake was transferred back to the flask, reslurried in 350 mL of heptane and rotated for an additional 30 minutes. The slurry was filtered a third time. The filter cake was transferred back to the flask, reslurried in 350 mL of heptane along with 11.25 mL of the 0.29 wt % solution of Stadis® 425 in heptane. The flask was placed on the rotating arm of a rotary evaporator and turned slowly for 15 minutes. The solvent was then removed under vacuum while heating to 60° C. to reach a final vacuum of 300 millitorr.
b) Preparation of Supported Catalyst A
Working in a glovebox under inert atmospheric conditions, 1.43 mL of a 9.58 weight percent toluene solution of Ionic Compound A and 0.42 mL of 0.25 molar TEAL in toluene were mixed in a 100 mL round-bottomed flask and allowed to sit for 5 minutes. 1.61 g of $SiO_2$/TEA was then added and the mixture was shaken on a Lab-Line Mistral Multi-Mixer at high speed for 1 hour.

0.85 mL of 10 wt % Complex D in heptane was premixed with the 0.3 mL of hexene. The molecule/hexene solution was then added to the round bottom flask containing the support/activator material. The flask was then shaken for 1 hour.

0.20 mL of a 0.29 wt % solution of Stadis® 425 in heptane was then added to the mixture followed by an additional 15 minutes of mixing. The flask was then placed under vacuum and dried to a residual pressure of 300 millitorr.

c) Preparation of Supported Catalyst B

Working in a glovebox under inert atmospheric conditions, 1.43 mL of a 9.58 weight percent toluene solution of Ionic Compound A and 0.42 mL of 0.25 molar TEA in toluene were mixed in a 100 mL round-bottomed flask and allowed to sit for 5 minutes. 1.61 g of $SiO_2$/TEA was then added and the mixture was shaken on a Lab-Line Mistral Multi-Mixer at high speed for 1 hour.

1.08 mL of 8 wt % Complex C in heptane was premixed with the 0.3 mL of hexene. The molecule/hexene solution was then added to the round bottom flask containing the support/activator material. The flask was then shaken for 1 hour.

0.20 mL of a 0.29 wt % solution of Stadis® 425 in heptane was then added to the mixture followed by an additional 15 minutes of mixing. The flask was then placed under vacuum and dried to a residual pressure of 300 millitorr.

Examples 8-11

Polymerizations

Ethylene-hexene copolymerization experiments were conducted on a 2 L, stirred, autoclave reactor in gas phase operation. Ethylene-hexene copolymerizations were run at 70° C. for 60 minutes with a total operating pressure of 300 psig. Gas phase compositions for ethylene and hexene were controlled via closed-loop process control to values of 50.0 and 0.14 mole percent, respectively. Hydrogen was metered into the reactor in a molar feed ratio of 0.00168 relative to ethylene feed during polymerization. Nitrogen constituted the remainder of the gas phase mixture (approximately 49.2 mole %). During reactor conditioning and setup, 0.4 mL of a 25 weight percent solution of tri-isobutylaluminum (TiBA) was used as an impurity scavenger to assist with purification of reactor internals and the 100 g HDPE seedbed. Catalyst (see Table 3) was loaded into an injection tube under anaerobic conditions in a glovebox and was then connected to the reactor. A portion of the nitrogen used to make up the reactor gas composition was used to push the catalyst into the reactor at the start of polymerization. The reactor was vented at a controlled rate throughout the polymerization, which in combination with gas consumption due to polymerization allowed for maintenance of controlled gas phase composition through the copolymerization reaction.

In this set of copolymerizations, Catalysts A and B were run as single catalysts. Additionally, 2:1 and 1:2 physical mixtures of catalyst A with catalyst B, were prepared as mixed catalysts, prior to polymerization, and were then used for the polymerizations shown in Examples 2 and 3 (Table 2).

TABLE 2

| Ex | Catalyst System | Productivity (gPE/gCat) | Mw (g/mol) | Branch (per 1000 C atoms) | M.Pt. (° C.) | PD (Mw/Mn) |
|---|---|---|---|---|---|---|
| 8 | 100% Cat A | 352 | 472272 | 7.6 | 119.6 | 3.39 |
| 9 | 67% Cat A:33% Cat B | 600.7 | 193372 | 5.5 | 128.7 | 8.27 |
| 10 | 33% Cat A:67% Cat B | 743.5 | 99793 | 4.5 | 128.1 | 4.08 |
| 11 | 100% Cat B | 1046.3 | 45235 | 3.6 | 128.0 | 2.08 |

Analytical Techniques

Polymer melting points were obtained via differential scanning calorimetry (DSC), which was performed using a TA Instruments, model Q1000 apparatus, with a scan rate of 10° C./minute in accordance with ASTM D3418-99.

Branch contents (comonomer content) were measured as per ASTM 6645-01.

Determination of molecular weight distribution and molecular weight averages (Mn, Mw, Mz) of resins were determined by high temperature Gel Permeation Chromatography (GPC) according to the ASTM D6474: "Standard Test Method for Determining Molecular Weight Distribution and Molecular Weight Averages of Polyolefins". The system was calibrated using sixteen polystyrene standards (Mw/Mn<1.1) in the MW range $5 \times 10^3$ to $8 \times 10^6$ and three hydrocarbon standards $C_{60}$, $C_{40}$, and $C_{20}$. As per ASTM D6474 the integration limits do not fall outside the elution volumes for the highest ($8 \times 10^6$ g/mol) and lowest (300 g/mol) calibration standards.

Operating conditions are listed below:

| | |
|---|---|
| GPC instrument: | Polymer Laboratories 220 equipped with a refractive index detector |
| Software: | PL DataStream with PL Cirrus software |
| Columns: | Four Shodex HT-800/S series cross-linked styrene-divinylbenzene with pore sizes $10^3$ Å, $10^4$ Å, $10^5$ Å, $10^6$ Å |
| Mobile Phase: | 1,2,4-Trichlorobenzene stabilized with 250 ppm of 2,6-di-tert-butyl-4-methylphenol |
| Temperature: | 140° C. |
| Flow Rate: | 1.0 ml/min |
| Sample Preparation: | Samples dissolved in the mobile phase by heating on a rotating wheel for four hours at 150° C. |
| Sample Filtration: | No |
| Concentration: | 0.1% (w/v) |

Branch contents as a function of polymer molecular weight were determined using the combined techniques of gel permeation chromatography—fourier transform infrared spectroscopy (GPC-FTIR). The technique uses a high temperature GPC for the molecular weight separation and an on-line FTIR detector for the concentration and the comonomer calculations. The GPC protocol is in accordance with ASTM D-6474 with the exception of the polymer concentration being between 0.03-0.05 w/v versus<0.03% in the ASTM method. The FTIR provides the polymer concentration as well as the comonomer content approximately every 10 seconds using methylene and methyl resonances in the 2800-3000 cm-1 wavelength region and a partial least squares algorithm. Polyethylene standards with known (NMR/FTIR) and flat comonomer content are used for calibration.

Polymerization data show systematic changes in catalyst productivity, polymer molecular weight and branch content as a function of the relative amounts of Catalyst A and Catalyst B in the mixed catalyst system. A step change in the melting point is seen as a function of the dominant contribution in the mixed polymer product arising from use of the mixed catalyst systems.

The breadth of the polymer molecular weight distribution (PD=polydispersity=Mw/Mn) is clearly increased for the mixed catalyst examples. (Examples 9 and 10).

Use of the combined analytical technique, gel permeation chromatograph—Fourier transform infrared spectroscopy (GPC-FTIR) allows one to characterize the comonomer branch content as a function of molecular weight for an ethylene-hexene copolymer. The GPC-FTIR analyses for the products from Examples 8 to 11 are shown in the attached FIG. 1.

Products obtained from the mixed catalyst systems (Examples 9 and 10) show a bimodal and broadened molecular weight distribution. The product obtained from Example 9 shows a reversed comonomer content distribution (i.e. more comonomer at higher molecular weight).

The invention claimed is:

1. A supported catalyst system for the polymerisation of olefins, said catalyst system comprising:
   (a) at least two different monocyclopentadienyl transition metal compounds, having the formula
   (i) (Cp)mM(PI)nLq
   wherein Cp is a ligand from the group consisting of cyclopentadienyl, substituted cyclopentadienyl, indenyl, substituted indenyl, fluorenyl and substituted fluorenyl,
   M is a Group 4 metal selected from hafnium, titanium or zirconium,
   PI is a phosphinimine ligand,
   L is an activatable ligand,
   m is 1 and n is 1 or 2, q is 1 or 2, and
   m+n+q equals the valence of said metal
   or
   (ii)

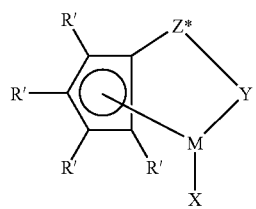

wherein:—
   R' each occurrence is independently selected from the group consisting of hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure; X is a neutral $\eta^4$ bonded diene group having up to 30 non-hydrogen atoms, which forms a $\pi$-complex with M;
   Y is —O—, —S—, —NR*—, —PR*—,
   M is titanium or zirconium in the +2 formal oxidation state;
   Z* is $SiR^*_2$, $CR^*_2$, $SiR^*_2SiR^*_2$, $CR^*_2CR^*_2$, $CR^*=CR^*$, $CR^*_2SiR^*_2$, or
   $GeR^*_2$, wherein:
   R* each occurrence is independently hydrogen, or a member selected from the group consisting of hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system,
   (b) one or more activators comprising an ionic compound comprising (i) a cation and (ii) an anion having up to 100 non-hydrogen atoms and the anion containing at least one substituent comprising a moiety having an active hydrogen, and
   (c) one or more support materials.

2. A catalyst system according to claim 1 wherein the phosphinimine ligands are defined by the formula:

$R_3P=N—$ wherein each R is independently selected from the group consisting of a hydrogen atom, a halogen atom, a $C_{1-20}$ hydrocarbyl radical, a $C_{1-8}$ alkoxy radical,
   a $C_{6-10}$ aryl or aryloxy radical, an amido radical, a silyl radical and a germanyl radical.

3. A catalyst system according to claim 1 wherein the monocyclopentadienyl transition metal compounds are titanium compounds.

4. A catalyst system according to claim 1 wherein the monocyclopentadienyl transition metal compounds are present in an equimolar ratio.

5. A catalyst system according to claim 1 wherein the activator is an alkylammonium(trispentafluorophenyl)(4-hydroxyphenyl)borate.

6. A catalyst system according to claim 1 wherein each monocyclopentadienyl transition metal compound are supported on the same support material.

7. A catalyst system according claim 1 wherein each monocyclopentadienyl transition metal compound are supported on a separate support material.

8. A catalyst system according to claim 1 comprising a physical mixture of
   (a) a first monocyclopentadienyl transition metal compound, an activator comprising an ionic compound comprising (i) a cation and (ii) an anion having up to 100 non-hydrogen atoms and the anion containing at least one substituent comprising a moiety having an active hydrogen and a support material, and
   (b) a second monocyclopentadienyl transition metal compound, an activator comprising an ionic compound comprising (i) a cation and (ii) an anion having up to 100 non-hydrogen atoms and the anion containing at least one substituent comprising a moiety having an active hydrogen and a support material.

9. A catalyst system according to claim 1 wherein the support material is silica.

10. A method for the preparation of a supported catalyst system for the polymerisation of olefins as claimed in claim 1, said method comprising the following steps:
    (i) addition of an activator comprising an ionic compound comprising (a) a cation and (b) an anion having up to 100 non-hydrogen atoms and the anion containing at least one substituent comprising a moiety having an active hydrogen to a support material,
    (ii) addition of a first monocyclopentadienyl transition metal compound, and
    (iii) addition of a second monocyclopentadienyl transition metal compound.

* * * * *